United States Patent
Arienti et al.

(10) Patent No.: US 10,464,541 B2
(45) Date of Patent: Nov. 5, 2019

(54) BRAKING SYSTEM FOR VEHICLES, IN PARTICULAR FOR CYCLES AND MOTORCYCLES, AND ACTUATION METHOD OF A BRAKING SYSTEM FOR VEHICLES

(71) Applicant: FRENI BREMBO S.p.A., Bergamo (Curno) (IT)

(72) Inventors: Roberto Arienti, Bergamo (IT); Andrea Odoni, Bergamo (IT); Carlo Cantoni, Bergamo (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 15/223,205

(22) Filed: Jul. 29, 2016

(65) Prior Publication Data
US 2017/0028973 A1   Feb. 2, 2017

(30) Foreign Application Priority Data
Jul. 31, 2015   (IT) ................. 102015000040987

(51) Int. Cl.
*B60T 8/42*   (2006.01)
*B60T 8/40*   (2006.01)
(Continued)

(52) U.S. Cl.
CPC ............ *B60T 8/404* (2013.01); *B60T 8/1706* (2013.01); *B60T 8/4022* (2013.01);
(Continued)

(58) Field of Classification Search
CPC ....... B60T 8/1706; B60T 8/4266; B60T 11/20
See application file for complete search history.

(56) References Cited

U.S. PATENT DOCUMENTS 4,653,815 A   3/1987  Agarwal et al.
5,152,588 A   10/1992 Bright et al.
(Continued)

FOREIGN PATENT DOCUMENTS

DE   3904614      8/1989
DE   3904614 A1   8/1989
(Continued)

OTHER PUBLICATIONS

International search report for application IT UB20152710; dated Mar. 15, 2016; Munich; 2 pages.
(Continued)

*Primary Examiner* — Bradley T King
(74) *Attorney, Agent, or Firm* — Merchant & Gould P.C.

(57) ABSTRACT

A braking system for vehicles comprising a pilot pump provided with a manual actuation means, the pilot pump being fluidically connected to a hydraulic actuator device in turn operatively connected to a braking device associated with a wheel of said vehicle, wherein the hydraulic actuator device delimits a first and a second actuation chamber fluidically separated by a movable septum along an axial direction X-X, the first actuation chamber containing fluid pressurized by the pilot pump, the second actuation chamber being filled with fluid under pressure and being provided with a delivery duct fluidically connected to said braking device. Advantageously, the hydraulic actuator device comprises a by-pass, offset axially with respect to said delivery duct and fluidically connected with the latter, the movable septum being connected to motor means in order to translate axially, independently of the braking action imposed through the manual actuation means of the pilot pump, the system comprising a processing unit and control operatively connected with the motor means and programmed so as to pass from a condition of standard operation or deactivation
(Continued)

of the motor means, in which the movable septum connects the first actuation chamber with the by-pass and with the second actuation chamber, to a braking correction condition in which the motor means are activated to move the movable septum so that the first actuation chamber is fluidically separated from the by-pass and the second actuation chamber. In this way, the second actuation chamber, fluidically connected to the delivery duct, commands the actuation of the braking device, excluding the action imposed by the user through the pressurized fluid in the first actuation chamber.

16 Claims, 5 Drawing Sheets

(51) Int. Cl.
  B60T 8/17    (2006.01)
  B60T 11/20   (2006.01)
  B60T 13/14   (2006.01)
  B62L 3/02    (2006.01)
  B62L 3/08    (2006.01)
  B62L 3/00    (2006.01)
  B60T 8/32    (2006.01)

(52) U.S. Cl.
  CPC .......... *B60T 8/4266* (2013.01); *B60T 11/20* (2013.01); *B60T 13/142* (2013.01); *B62L 3/023* (2013.01); *B62L 3/08* (2013.01); *B60T 8/3225* (2013.01); *B62L 3/00* (2013.01)

(56) References Cited

U.S. PATENT DOCUMENTS

| | | | | |
|---|---|---|---|---|
| 5,246,283 A | * | 9/1993 | Shaw | B60L 7/18 303/113.2 |
| 5,758,930 A | * | 6/1998 | Schiel | B60T 7/042 188/358 |
| 6,082,831 A | * | 7/2000 | Hageman | B60T 8/326 303/115.2 |
| 6,533,369 B2 | * | 3/2003 | Baumgartner | B60T 8/4081 303/11 |
| 7,794,026 B2 | * | 9/2010 | Nakayama | B60T 8/1706 303/113.1 |
| 2007/0251231 A1 | * | 11/2007 | Arnold | B60T 7/042 60/545 |
| 2009/0240399 A1 | * | 9/2009 | Dagenais | B60T 8/1706 701/42 |
| 2013/0231825 A1 | * | 9/2013 | Chundrlik, Jr. | B60W 50/0098 701/29.1 |
| 2017/0066442 A1 | * | 3/2017 | Woodley | B60T 17/221 |

FOREIGN PATENT DOCUMENTS

| | | |
|---|---|---|
| DE | 102012222058 | 6/2014 |
| DE | 102012222058 A1 | 6/2014 |
| EP | 0152344 | 8/1985 |
| EP | 0152344 A1 * | 8/1985 ........... B60T 8/4266 |
| EP | 0152344 A2 | 8/1985 |
| WO | WO2014/108235 | 7/2014 |
| WO | WO2014108235 | 7/2014 |

OTHER PUBLICATIONS

European Patent Office Application No. 16 181 891.9—1012 Intention to Grant dated Apr. 9, 2019 for related EP application, 5 pages.
European Search Report for corresponding European Patent Application No. 16181891 dated Oct. 10, 2016, 2 pages.

\* cited by examiner

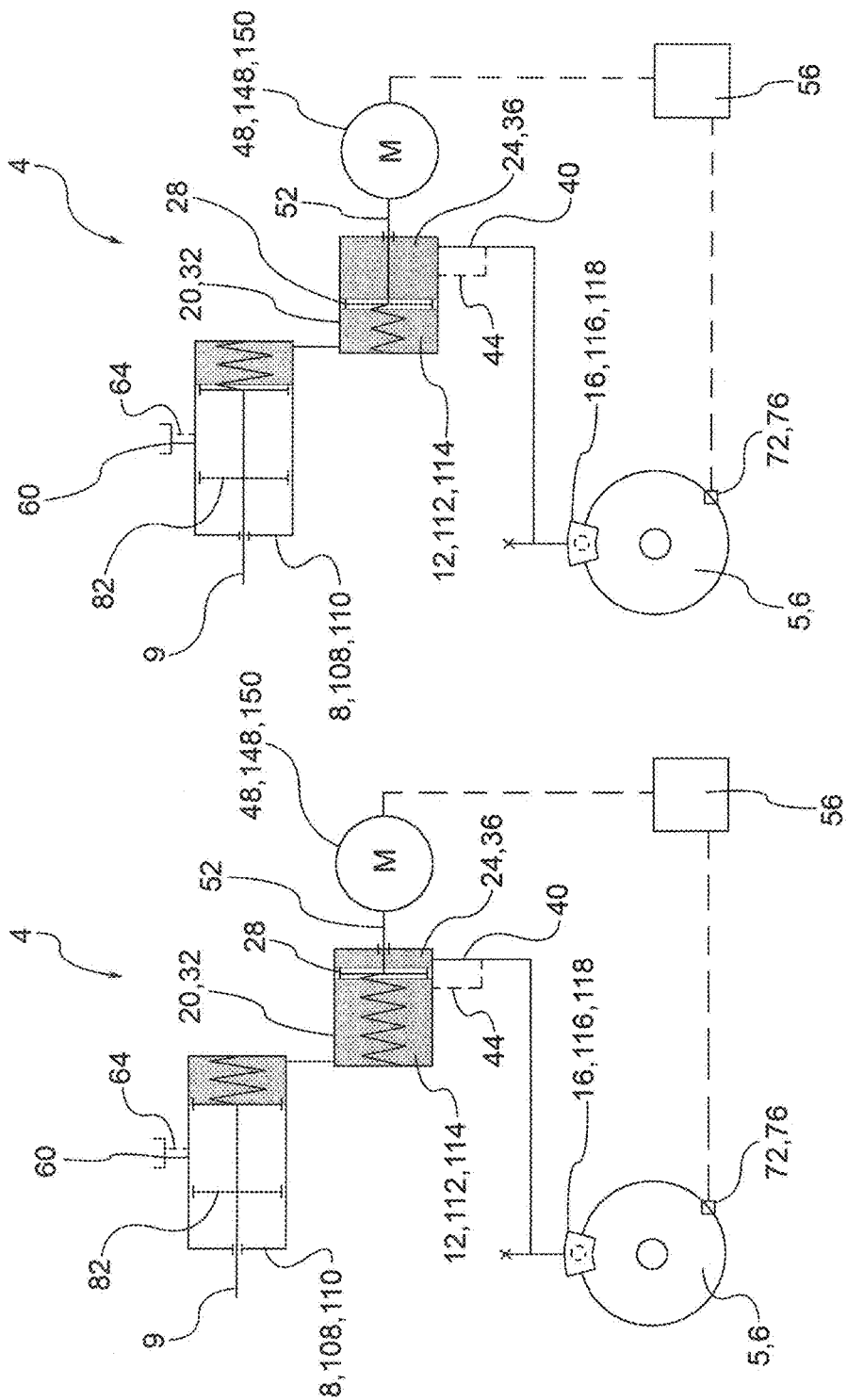

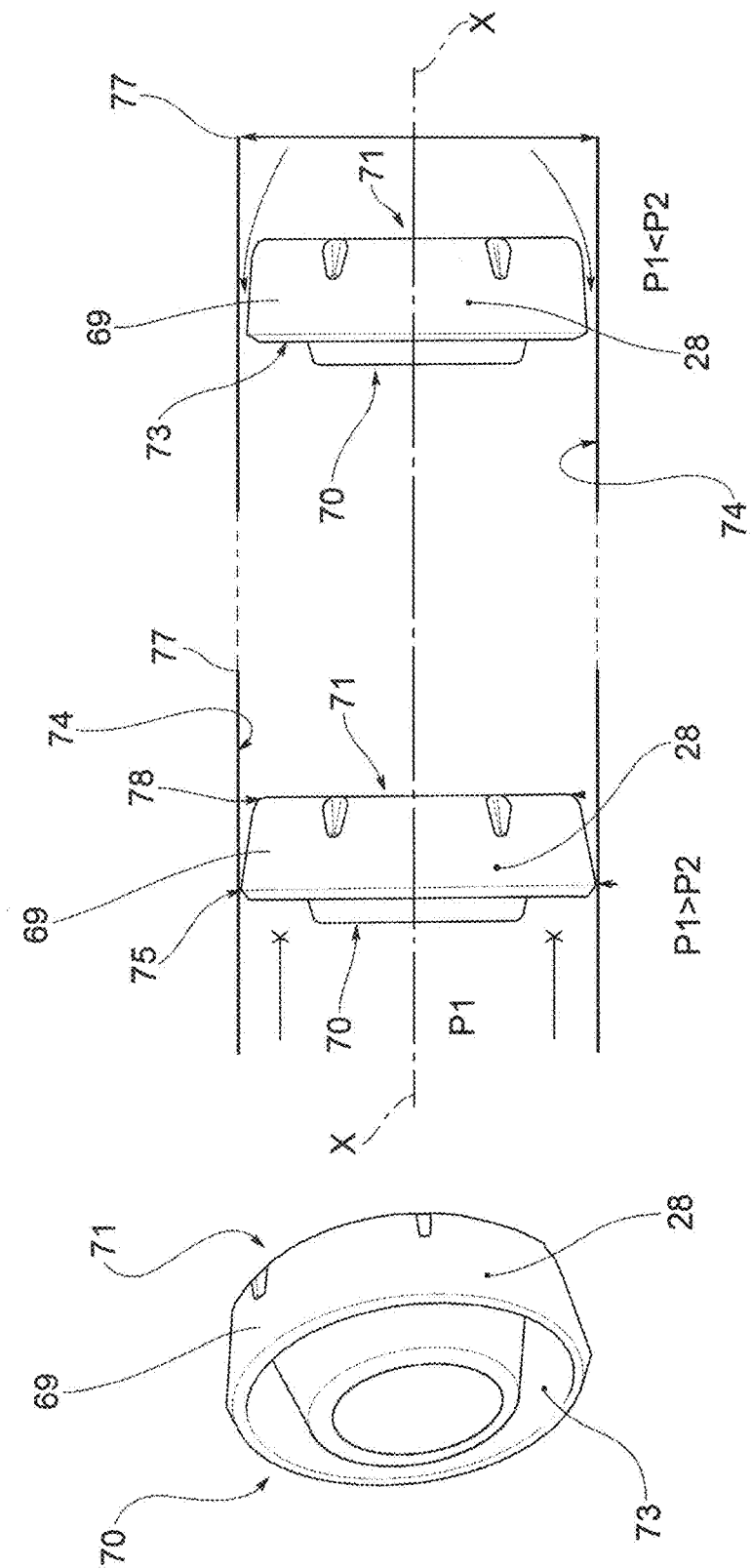

BRAKING SYSTEM FOR VEHICLES, IN PARTICULAR FOR CYCLES AND MOTORCYCLES, AND ACTUATION METHOD OF A BRAKING SYSTEM FOR VEHICLES

CROSS-REFERENCE TO RELATED APPLICATION

This application is a continuation of and claims priority to Italian Patent Application Serial Number 102015000040987, entitled: "Braking system for vehicles, in particular for cycles and motorcycles, and actuation method of a braking system for vehicles" filed on Jul. 31, 2015, which is herein incorporated by reference in its entirety.

FIELD OF APPLICATION

This invention regards a braking system for vehicles and the actuation method of a braking system for vehicles.

STATE OF THE ART

In particular, in the vehicle sector, in particular two-wheeled vehicles such as cycles and motorcycles, the use of mechanically or hydraulically actuated breaking systems is known.

Braking systems for cycles and motorcycles of the known type do not always provide for anti-lock devices of the wheels or, in any case, braking correction devices to improve the stability of the vehicle. For example the need to improve the stability of the vehicle can occur in case of incipient loss of control of the stability of the vehicle, for example in case of possible tipping over, i.e., lifting of the rear wheel, or the event of misalignment between the front and rear wheel.

PRESENTATION OF THE INVENTION

To date, specific solutions for the above problems have not been adopted in the art, leaving the control of braking and vehicle dynamics to the user, especially in the case of cycles.

The reason for this choice lies both in the reduced performance of cycles, if for example compared to motor vehicles and the need to contain the costs of the cycles themselves.

However, users do not always have the necessary sensitivity to intervene appropriately and promptly correcting the braking action on one or more wheels.

In addition, the prior art cycles are allowing the achievement of increasing higher performance, thanks to the reduction of masses and/or use of pedaling assistance systems.

Braking correction systems have been used in the field of motor vehicles but these are quite expensive and complex to manufacture, especially for applications on "light" motor-cycles.

Therefore, there is an increasingly felt need to solve the above drawbacks and limitations of the prior art.

This need is met by a braking system for vehicles according to claim 1 and by a method for the actuation of a braking system for vehicles according to claim 12.

In particular, this need is met by a braking system for vehicles comprising a pilot pump provided with a manual actuation means, a lever and/or pedal, which is fluidically connected to a hydraulic actuator device, wherein said hydraulic actuator device is operatively connected to a braking device associated with a wheel of said vehicle, wherein the hydraulic actuator device delimits a first and a second actuation chamber separated fluidically by a movable septum along an axial direction X-X, wherein the first actuation chamber delimits a first volume that contains fluid pressurised by the pilot pump by means of the manual actuation means, wherein the second actuation chamber delimits a second volume that contains pressurised fluid and is provided with a delivery duct fluidically connected to said braking device, characterised in that the hydraulic actuator device comprises a by-pass, offset axially with respect to said delivery duct and fluidically connected with the latter, the movable septum is connected to motor means so as to translate axially, independently of the braking action imposed by the pilot pump by means of the manual actuation means, the system comprising a processing and control unit operatively connected with said motor means and programmed so as to pass from a standard operating or deactivation condition of the motor means, in which the movable septum connects the first actuation chamber with the by-pass, the second actuation chamber and the delivery duct, to a braking correction condition in which the motor means are activated to translate the movable septum so that the first actuation chamber is fluidically separated from the by-pass and the second actuation chamber, and in a manner such that the second actuation chamber is fluidically connected to the delivery duct to control the actuation of the braking device by means of the pressurised fluid contained in the second actuation chamber, wherein the movable septum is configured in such a way that the pressure in the first actuation chamber is always greater than, or equal to, the pressure in the second actuation chamber, wherein said movable septum comprises a lip gasket elastically deformable so as to ensure said pressure difference between the first and the second actuation chamber.

According to a possible embodiment, the lip gasket is shaped so as to have a frustoconical body that tapers moving from a first face facing the first actuation chamber (20) to a second face facing the second actuation chamber (24).

According to a possible embodiment, the first and the second face have a circular section so as to be counter-shaped with respect to a circular cross-section of said chambers.

According to a possible embodiment, the frustoconical body comprises an annular seat formed on the side of the first face so as to receive the pressurised fluid from the side of the first actuation chamber (20) and to deform, ensuring sealing against an inner side wall of a volume that delimits the first and the second actuation chamber.

According to a possible embodiment, the first face has a first outer diameter substantially equal to the inner diameter of an inner side wall of the volume that delimits the first and the second actuation chamber, and in which the second face has a second external diameter less than the inner diameter of an inner side wall of the volume that delimits the first and the second actuation chamber, so as to allow the radial crushing of the frustoconical body when the pressure in the second actuation chamber exceeds the pressure in the first actuation chamber.

According to a possible embodiment, the hydraulic actuator device is configured in such a way that, in a condition of rest or non-actuation, and in the standard operating condition, the movable septum is positioned between the by-pass and the delivery duct so as to allow the fluid connection between said first and second actuation chamber through the by-pass, the pressures in said first and second actuation chamber being equal to each other and to the pressure in the delivery duct.

According to a further embodiment, the hydraulic actuator device is configured in such a way that, in the braking correction condition, the processing and control unit controls the motor means to move the movable septum so as to fluidically separate the first actuation chamber from the by-pass, reducing the first volume of the first actuation chamber and increasing the second volume of the second actuation chamber to decrease the pressure in said second actuation chamber and in said delivery duct.

According to a possible embodiment, the hydraulic actuator device is connected to a hydraulic fluid reservoir through a channel arranged on the hydraulic actuator device upstream of the movable septum and the by-pass, so as to allow the compensation of wear of the friction material of the braking device by means of the injection of hydraulic fluid into the first actuation chamber.

According to a possible embodiment, the motor means comprise an electric motor and a related kinematic connection mechanism for the translation of the movable septum.

According to a possible embodiment, said kinematic connection mechanism is of the reversible type.

According to a possible embodiment, the system comprises at least one vehicle wheel-lock detection sensor and/or at least one vehicle stability sensor, said sensors being operationally connected with the processing and control unit so as to control the actuation of the motor means as a function of data received from said vehicle wheel-lock and/or stability sensors.

According to a possible embodiment, said braking device comprises a disc, drum or shoe brake.

According to a possible embodiment, the braking system comprises a front pilot pump with associated front manual actuation means and a rear pilot pump with associated lever or pedal rear manual actuation means, each pilot pump being operationally connected to a respective separate front and rear hydraulic actuator device, wherein each front and rear hydraulic actuator device is operationally connected to a separate front and rear braking device associated, respectively, with a front and rear wheel of said vehicle, wherein each front and rear hydraulic actuator device is provided with its own front and rear motor means and is configured according to what is explained above, and wherein the system is provided with a processing and control unit operationally connected to the front and rear motor means of each front and rear hydraulic actuator device, in order to oversee the functioning of the braking system.

As seen this invention also relates to a method of actuating a braking system for vehicles.

According to a possible embodiment, the method of actuating a braking system for vehicles comprises the steps of:

preparing a pilot pump provided with a lever and/or pedal manual actuation means, the pilot pump being fluidically connected to a hydraulic actuator device, wherein said hydraulic actuator device is operatively connected to a braking device associated with a wheel of said vehicle, wherein the hydraulic actuator device delimits a first and a second actuation chamber separated fluidically by a movable septum along an axial direction X-X, the first actuation chamber delimits a first volume that contains fluid pressurised by the pilot pump, the second actuation chamber delimits a second volume that contains pressurised fluid and is provided with a delivery duct fluidically connected to said braking device, characterised in that it comprises the steps of preparing in said hydraulic actuator device, a by-pass, offset axially with respect to said delivery duct and fluidically connected with the latter, preparing motor means connected to the movable septum so that it can translate axially, independently of the braking action imposed by the manual activation means of the pilot pump, preparing a processing and control unit operatively connected with said motor means and programmed so as to pass from a standard operating or deactivation condition of the motor means, in which the movable septum connects the first actuation chamber with the by-pass, the second actuation chamber and the delivery duct to a braking correction condition in which the motor means are activated to translate the movable septum so that the first actuation chamber is fluidically separated from the by-pass and the second actuation chamber, and in a manner such that the second actuation chamber is fluidically connected to the delivery duct to control the actuation of the braking device by means of the pressurised fluid contained in the second actuation chamber.

According to a possible embodiment, the method comprises the step of configuring the hydraulic actuator device in such a way that, in a condition of rest or non-actuation, and in the standard operating condition, the movable septum is positioned between the by-pass and the delivery duct so as to allow the fluid connection between said first and second actuation chamber through the by-pass, the pressures in said first and second actuation chamber being equal to each other and to the pressure in the delivery duct.

According to a possible embodiment, the method comprises the step of configuring the hydraulic actuator device in such a way that, in the braking correction condition, the processing and control unit controls the motor means to move the movable septum so as to fluidically separate the first actuation chamber from the by-pass, and to increase the volume of the second chamber to reduce the pressure in said second actuation chamber and in said delivery duct.

According to a possible embodiment, the method comprises the step of configuring the movable septum in such a way that the pressure in the first actuation chamber is always greater than, or equal to, the pressure in the second actuation chamber.

According to a possible embodiment, the method comprises the step of providing the system with at least one vehicle wheel-lock detection sensor and/or at least one vehicle stability sensor, said sensors being operationally connected with the processing and control unit so as to control the actuation of the motor means as a function of data received from said vehicle wheel-lock and/or stability sensors.

DESCRIPTION OF THE DRAWINGS

Further characteristics and advantages of this invention will be more understandable from the following description of its preferred and non-limiting examples of embodiments, in which:

FIGS. 4a and 4b represent, respectively, schematic views of a braking system according to this invention, in a standard operating condition and in a condition of operation in active or braking correction mode, respectively;

FIG. 5 is a side view of a lip gasket according to this invention;

FIGS. 6a and 6b represent the deformation of the lip gasket in different operating conditions.

The elements, or parts of elements, in common between the embodiments described below will be indicated with the same reference numbers.

DETAILED DESCRIPTION

Figure 1:
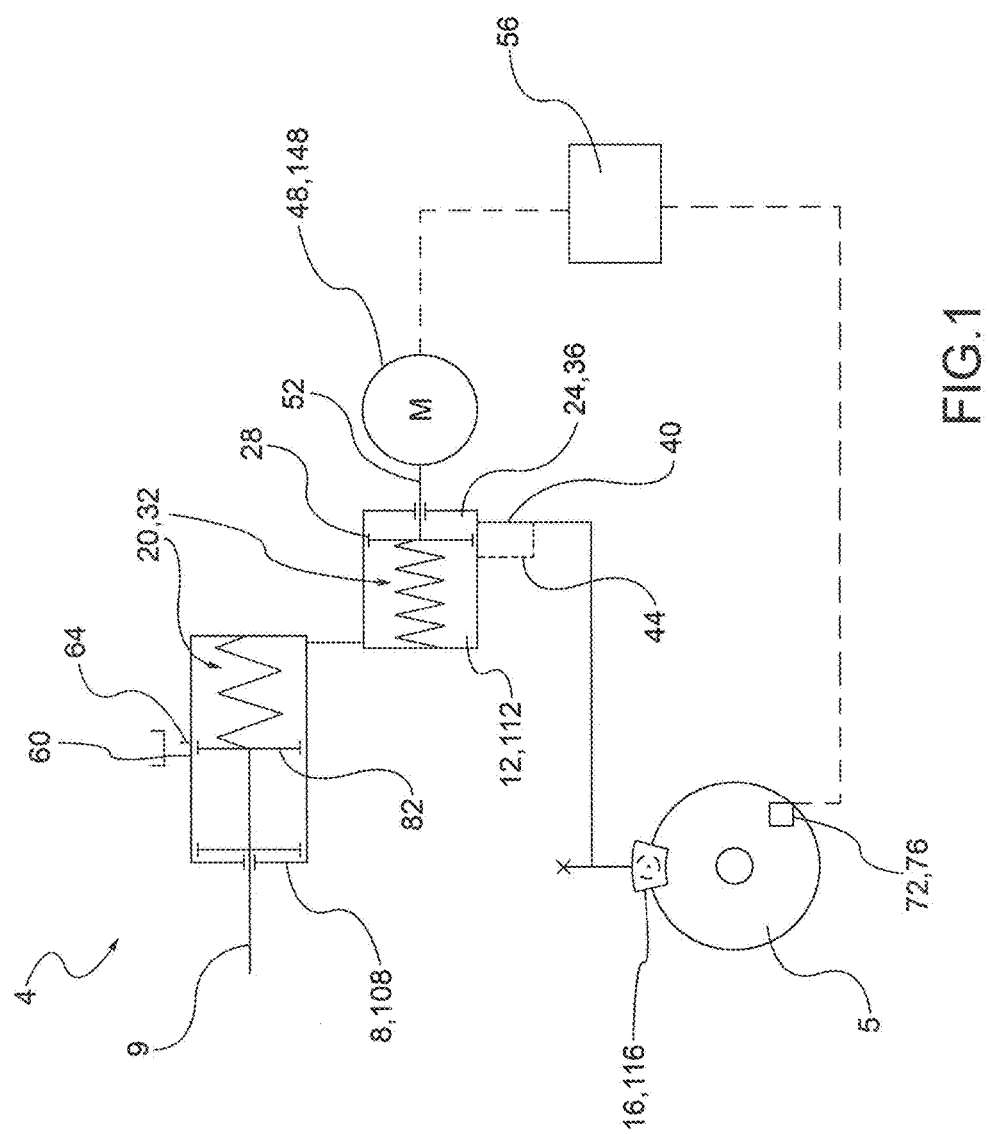
FIG. 1 is a schematic view of a braking system for vehicles according to a first embodiment of this invention, in a standard operating condition.

With reference to the above figures, the reference number 4 globally indicates a braking system for vehicles.

For the purposes of this invention, the word vehicles means both cycles, such as bicycles with two or more wheels, or motorcycles. For example, these also include cycles and motorcycles with two or more front wheels 5 and/or also two or more rear wheels 6.

In addition, it means human-powered cycles, but also the so-called assisted pedaling cycles or those, in any case, provided with auxiliary motor means.

The braking system for vehicles 4 comprises a pilot pump 8 provided with a manual actuation means 9 and a lever and/or pedal, which is fluidically connected to a hydraulic actuator device 12.

The pilot pump 8 comprises a float 82 operatively connected to the manual actuation means 9.

The hydraulic actuator device 12 is operatively connected to a braking device 16 associated with a wheel 5,6 of said vehicle.

For example, the braking device 16 comprises a disc, drum or shoe brake associated to a wheel of the vehicle 5,6.

The hydraulic actuator device 12 delimits a first and a second actuation chamber 20,24 separated fluidically by a movable septum 28 along an axial direction X-X.

Wherein the first actuation chamber 20 delimits a first volume 32 that contains fluid pressurised by the pilot pump 8 by means of the manual actuation means 9 and the float 82; the second actuation chamber 24 delimits a second volume 36 that contains pressurised fluid and is provided with a delivery duct 40 fluidically connected to said braking device 16.

The delivery conduit 40 then sends pressurised fluid for the actuation of said braking device 16.

The hydraulic actuator device 12 comprises a by-pass 44, offset axially with respect to said delivery duct 40 and fluidically connected with the latter.

The movable septum 28 is connected to motor means 48 so as to translate axially, independently of the braking action imposed by the pilot pump 8 by means of the manual actuation means 9.

According to a possible embodiment, the motor means 48 comprise an electric motor and a related kinematic connection mechanism 52 for the controlled translation of the movable septum 28.

Preferably, said kinematic connection mechanism 52 is of the reversible type. This condition of reversibility is a safety condition: in fact, if for some reason the movable septum 28 is stopped beyond the by-pass 44, and the system was irreversible, the user would no longer be able to brake. Since the kinematic connection mechanism 52 is, instead, reversible, by applying pressure through the manual actuation means 9, you can send back the movable septum 28 and thus it is possible to brake safely.

In the operating conditions of the system, the position of the movable septum 28 is maintained through the powering and control of the motor means 48.

The braking system for vehicles 4 of this invention comprises a processing and control unit 56 operatively connected with said motor means 48, and programmed so as to pass from a standard operating condition or deactivation of the motor means 48, to a braking correction condition in which the motor means 48 are activated.

In particular, in said standard operating condition or deactivation of motor means 48, the movable septum 28 connects the first actuation chamber 20 with the by-pass 44, the second actuation chamber 24 and thus with the delivery duct 40.

In said braking correction condition, the motor means 48 are activated to translate the movable septum 28 so that the first actuation chamber 20 is fluidically separated from the by-pass 44 and the second actuation chamber 24, and in a manner such that the second actuation chamber 24 is fluidically connected to the delivery duct 40 to control the actuation of the braking device 16 by means of the pressurised fluid contained in the second actuation chamber 24.

The hydraulic actuator device 12 is configured in such a way that, in a condition of rest or non-actuation, and in the standard operating condition, the movable septum 28 is positioned between the by-pass 44 and the delivery duct 40 so as to allow the fluid connection between said first and second actuation chamber 20,24 through the by-pass 44; in this way the pressures in said first and second actuation chamber 20,24 are equal to each other and to the pressure in the delivery duct 40.

Moreover, the hydraulic actuator device 12 is configured in such a way that, in the braking correction condition, the processing and control unit 56 controls the motor means 48 to move the movable septum 28 so as to fluidically separate the first actuation chamber 20 from the by-pass 44, reducing the volume of the first actuation chamber 20 and increasing the volume of the second actuation chamber 24 to decrease the pressure in said second actuation chamber 24 and, consequently, in said delivery duct 40.

According to a possible embodiment, the hydraulic actuator device 12 is connected to a hydraulic fluid reservoir 60 through a channel 64 arranged on the hydraulic actuator device 12 upstream of the movable septum 28 and of the by-pass 44, so as to allow the compensation of wear of the friction material of the braking device 16 by means of the injection of hydraulic fluid into the first actuation chamber 20.

Preferably, the movable septum 28 is configured in such a way that the pressure P1 in the first actuation chamber 20 is always greater than, or equal to, the pressure P2 in the second actuation chamber 24.

According to an embodiment, the movable septum 28 comprises a lip gasket 68 elastically deformable so as to ensure said pressure difference between the first and the second actuation chamber 20,24: in other words, the lip gasket 68 deforms so as to prevent that the pressure P2 in the second actuation chamber 24 could be higher than the pressure P1 in the first actuation chamber 20.

In other words, the lip gasket 68 is configured so that the actuation chambers 20,24 are fluidically disconnected from each other until the pressure P1 in the first actuation chamber 20 is greater than or equal to the pressure P2 in the second actuation chamber 24; otherwise the lip lowers and the actuation chambers 20,24 return connected (as long as the above-indicated condition is met).

In particular, according to an embodiment, the lip gasket 68 is shaped so as to have a frustoconical body 69 that tapers moving from a first face 70 facing the first actuation chamber 20 to a second face 71 facing the second actuation chamber 24.

The first and the second face 70,71 preferably have a circular section so as to be counter-shaped with respect to a circular cross-section of said first and second actuation chambers 20,24.

According to an embodiment, the frustoconical body 69 comprises an annular seat 73 formed on the side of the first face 70 so as to receive the pressurised fluid from the side of the first actuation chamber 20 and to deform, ensuring sealing against an inner side wall 74 of a volume that delimits the first and the second actuation chamber 20,24. Such configuration of elastic deformation of the lip gasket 68, which ensures the hydraulic seal against the inner side wall 74 of the pump body is illustrated in FIG. 6a. In this way, it is ensured that the pressure P1 in the first actuation chamber 20 is greater than, or equal to, the pressure P2 in the second actuation chamber 24.

For example, the first face 70 has a first outer diameter 75 substantially equal to the inner diameter 77 of the inner side wall 74 of the volume that delimits the first and the second actuation chamber 20,24. The second face 71 has a second outer diameter 78 less than the inner diameter 77 of the inner side wall 74 of the volume that delimits the first and the second actuation chamber 20,24, so as to allow the radial crushing of the frustoconical body 69 when the pressure P2 in the second actuation chamber 24 exceeds the pressure P1 in the first actuation chamber 20. Such configuration of elastic deformation of the lip gasket 68, which ensures the hydraulic connection between the first and second actuation chamber 20,24, by losing the hydraulic seal between the lip gasket 68 and the inner side wall 74, is illustrated in FIG. 6b. In this way, it is ensured that the pressure P2 in the second actuation chamber 24 cannot be greater than the pressure P1 in the first actuation chamber 20.

The asymmetric behaviour of the lip gasket 68 is due to the frustoconical geometry of the body 69, which allows obtaining a behaviour comparable to that of a one-way valve: in fact, the passage of fluid is only allowed in one direction, i.e., from the second actuation chamber towards the first actuation chamber 20, but not vice versa because, by increasing the pressure from the side of the first actuation chamber 20, the gasket elastically deforms in a barrel shape, increasing the diameter of the first face 70 so as to increase the hydraulic seal and prevent the passage of fluid. While, by increasing the pressure on the side of the second actuation chamber 24, the gasket elastically deforms being crushed, reducing the diameter of the first face 70 so as to lose hydraulic seal and allow the passage of fluid, by making the pressure in the two chambers 20,24 equal.

According to an embodiment, the braking system for vehicles 4 comprises at least one vehicle wheel-lock detection sensor 72 and/or at least one vehicle stability sensor 76, said sensors 72,76 being operationally connected with the processing and control unit 56 so as to command the actuation of the motor means 48 as a function of data received from said vehicle wheel-lock 72 and/or stability 76 sensors.

For example, if one or more of said sensors 72,76 detects a condition of dynamic instability of the vehicle, such as, for example, the locking of a wheel 5,6, the lifting of the rear wheel 6 or a skid, it communicates this condition to the processing and control unit 56, which consequently commands the motor means 48 to reduce braking on the wheel or wheels 5,6 that are triggering the instability of the vehicle.

Note that, in the accompanying figures, the wheel-locking 72 and/or stability sensors 76 of the vehicle are indicated schematically in correspondence of the vehicle wheels. This positioning is purely indicative and schematic, and should not be considered in any way limitative.

The motor means 48 move the movable septum 28 in order to fluidically separate the delivery duct 40 from the first actuation chamber 20, the first volume 32 of which is reduced; simultaneously, the second volume 36 of the second actuation chamber 24 is increased so as to reduce the internal pressure P2 of said second actuation chamber 24, and thus the pressure inside the delivery duct 40. In this way, the braking action of the braking device 16 fluidically connected to said delivery conduit 40 is reduced, eliminating the cause of instability of the vehicle dynamics.

The braking system for vehicles of this invention can be implemented in various embodiments.

Note that the braking system for vehicles 4 according to this invention can comprise a plurality of pilot pumps and their associated hydraulic actuator devices and braking devices, connected to distinct wheels 5,6 of the vehicle.

For example, the braking system for vehicles 4 comprises a front pilot pump 108 with associated front manual actuation means 9 and a rear pilot pump 110 with associated lever or pedal rear manual actuation means, each pilot pump 108,110 being operationally connected to a respective separate front 112 and rear 114 hydraulic actuator device.

Each front and rear 112,114 hydraulic actuator device is operationally connected to a separate front 116 and rear 118 braking device associated, respectively, with a front 5 and rear 6 wheel of said vehicle.

In addition, each front and rear hydraulic actuator device 112,114 is provided with its own front and rear motor means 148,150.

The system is also provided with a processing and control unit 56 operatively connected to the front and rear motor means 148,150 each front and rear hydraulic actuator device 112,114, in order to monitor the functioning of the braking system 4. According to an embodiment, said processing and control unit 56 is unique in order to globally monitor the dynamic behaviour of the vehicle by acting on all braking devices present on the vehicle. It is also possible to provide processing and control units 56 separated from each other.

Furthermore, it is also possible to provide a mixed system, in which there is a braking system according to this invention applied to at least one wheel of the vehicle and a traditional type braking system applied to at least another wheel of the vehicle.

Furthermore, the braking system according to this invention can be mounted on an existing system afterwards, as a kit.

We will now describe the operation of a braking system for vehicles according to this invention.

In particular, as seen, the braking system of this invention has two operating conditions, namely a standard operating condition, in which the system does not perform any intervention or correction on the braking action requested by the user, and a condition of active operation or braking correction, in which the system intervenes by modifying the braking action requested by the user in order to improve the dynamic stability of the vehicle.

Figure 2:
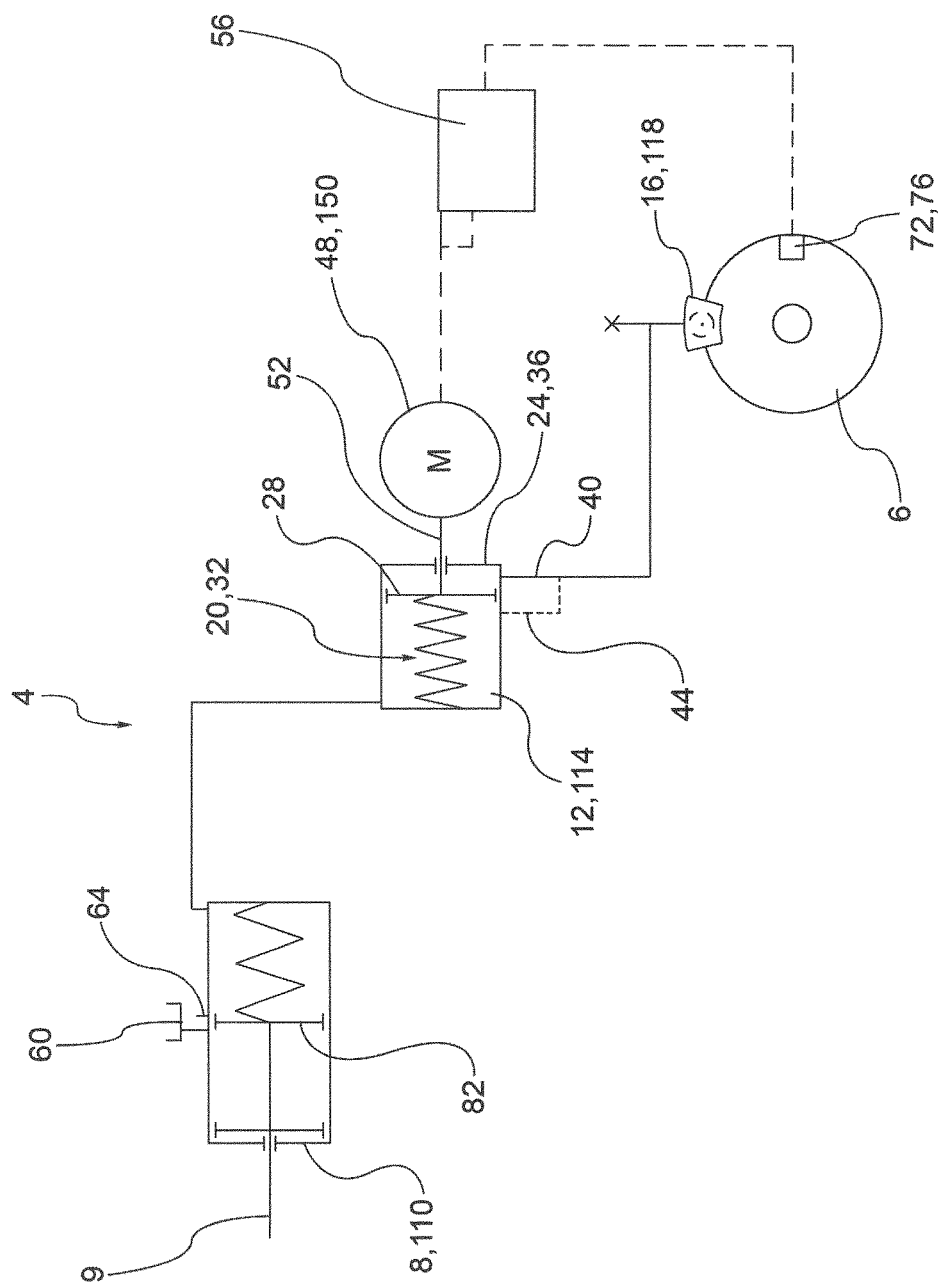
FIG. 2 is a schematic view of a braking system for vehicles according to a second embodiment of this invention, in a standard operating condition.
Figure 3:
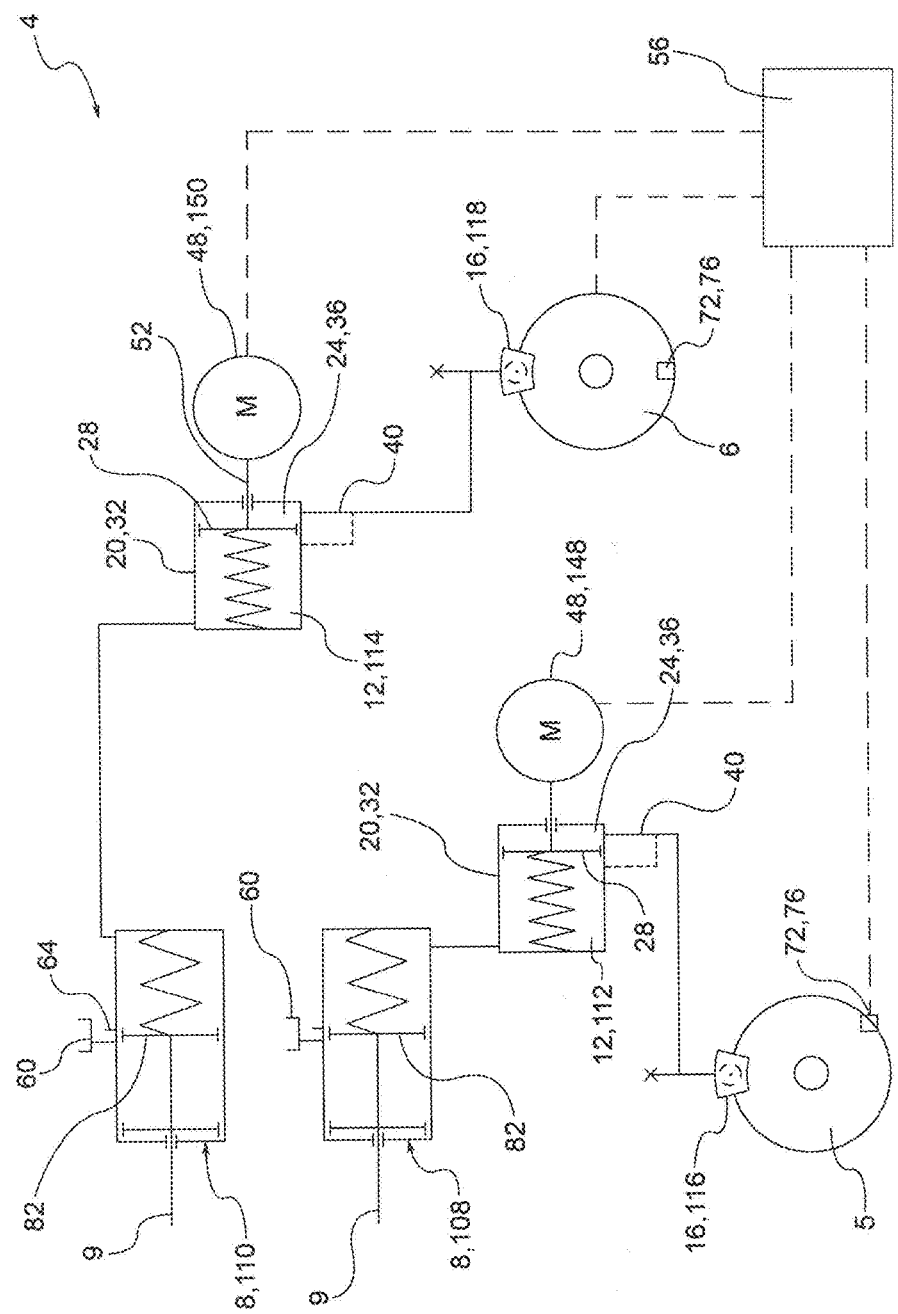
FIG. 3 is a schematic view of a braking system for vehicles according to a third embodiment of this invention, in a standard operating condition.

During the standard operating condition, illustrated for example in FIGS. 1, 2, 3 and 4*a*, the force exerted by the driver on the float of the pilot pump, through actuation of the lever or pedal, pushes the brake fluid of the first actuation chamber of the hydraulic actuator device. In this standard condition, the motor means are deactivated and the first and the second actuation chamber are fluidically connected to each other by means of the by-pass. Therefore, the movable septum is by-passed and the pressurised brake fluid is sent into the delivery duct and, through this, to the braking device.

In this condition, braking takes place by direct action of the driver, exactly as in the known types of systems: in fact, it is the driver who establishes the delivery pressure of the fluid in the delivery duct through his direct action on the manual actuation means 9, whether it is a lever or pedal. This is due to the fact that the pressure P1 in the first delivery chamber, directly proportional user's action on the manual actuation means 9, coincides with the pressure P2 of the second delivery chamber, thanks to the by-pass that fluidically connects said first and second delivery chamber.

As seen, the processing and control unit is able to monitor and therefore prevent the incipience of an unstable condition of the vehicle, due for example to the locking of one or more wheels 5,6, the lifting of the rear wheel 6, with relative risk of the vehicle tipping over, or the misalignment between the front 5 and rear 6 wheel that occurs for example occurs in the case of drift, in case of locking of the rear wheel 6.

During the braking correction condition (FIG. 4*b*), the processing and control unit first detects an abnormal braking condition, namely a user-requested braking condition that compromises the dynamic stability of the vehicle, determined according to predefined parameters.

Having identified such abnormal condition, the processing and control unit determines the intervention, i.e., the braking correction, by acting through the motor means.

In this operating condition, the force exerted by the driver on the float of the pilot pump, through the manual actuation means 9, pushes the brake fluid in the first actuation chamber of the hydraulic actuator device. After detecting the critical condition, the processing and control unit commands the motor means to translate the movable septum so that the first actuation chamber is fluidically separated from the by-pass and the second actuation chamber, and in a manner such that the second actuation chamber is fluidically connected to the delivery duct to command the actuation of the braking device by means of the pressurised fluid contained in the second actuation chamber.

So, the user's action is by-passed from the moment that the fluid of the first actuation chamber is fluidically disconnected from the delivery duct; therefore, the first and the second actuation chamber are fluidically disconnected from each other.

In other words, the lip gasket is configured so that the actuation chambers are fluidically disconnected from each other until the pressure P1 in the first actuation chamber is greater than, or equal to, the pressure P2 in the second actuation chamber; otherwise the lip lowers and the actuation chambers return connected (as long as the above-indicated condition is met).

In this configuration, the volume of the first actuation chamber is reduced by the movement of the movable septum and therefore the manual actuation means 9 is pushed back with respect to the position initially imposed by the user who, consequently, receives an immediate feedback on the intervention of the braking correction.

In addition, the volume of the second actuation chamber is increased by the movement of the movable septum: in this way, the pressure P2 in the second actuation chamber, and therefore in delivery duct, is reduced and with it the braking action of the corresponding braking device, as long as the processing and control unit does not detect the cessation of the critical dynamic condition of the vehicle.

At the end of this critical condition, the system returns to the standard operating condition in which the braking devices are directly controlled by the action exerted by the user on the pilot pump through the manual actuation means 9.

Note that, without the presence of the lip gasket, at the end of braking it would happen that, even if the driver released the lever or manual actuation means 9, the pressure P2 in the second actuation chamber 24 would remain "trapped" in the calipers, which would continue to brake.

To discharge this pressure P2 in the second actuation chamber 24, the motor means 48 should "pull" the movable septum 28 to uncover the bypass 44: from the starting point, to the by-pass point, this action of the motor means 48 would increase the caliper pressure, generating unwanted braking. Instead, the pressure must be immediately discharged at the end of braking and the fluid must return to the pump; at the same time, the mobile septum must retract without generating pressure in the downstream braking devices.

To avoid these problems, you could add an expensive check-valve; the use of the lip gasket 68 make the actuator simpler and more economical, without sacrificing reliability.

As can be appreciated from the description, the braking system for vehicles according to the invention allows overcoming the drawbacks presented in the prior art.

In particular, the system is able to actively intervene on the braking action of the vehicle imposed by the user and promptly correct it in order to prevent the locking of one or more wheels of the vehicle but also in order to improve the stability of the vehicle. Improving the stability of the vehicle means the ability to reduce the braking action on one or more wheels imposed by the user, for example in order to prevent the lifting of the rear wheel and the possible tipping over of the vehicle or in order to prevent the misalignment of the vehicle wheels as a result of their yaw.

In other words, the braking system is able to reduce or even cancel the braking action imposed by the user on one or more wheels of the vehicle, in order to improve dynamic stability.

The system acts promptly and in a repeatable and reliable manner.

The braking system of this invention has a relatively low cost and adds very limited, and therefore acceptable weight to the vehicle compared to the prior art solutions.

Advantageously, the system according to this invention is able to warn the driver of its braking correction intervention: in this way, the driver receives feedback through the manual actuation means, whether lever or pedal, and can for example take notice of the incorrectness of his manner of driving modes and modify it accordingly.

As seen, this feedback consists of a reaction to manual control that not only opposes the intensification of the braking action but tends to reduce it by returning the manual control to a position of lesser braking request.

Note that the use of the gasket automates control of the pressure so that the pressure in the first actuation chamber is always greater than, or equal to, the pressure in the second actuation chamber, without the need for costly additional control valves that, in addition to increasing the costs of system components, also require a relative operational connection to the processing unit and control and a complication in controlling the feedback of the operation of the braking system.

The control of the solution according to the invention is therefore economical and reliable at the same time.

A person skilled in the art, in order to satisfy contingent and specific needs, may make numerous modifications and variations to the braking systems and actuation methods of braking systems for vehicles described above, all however contained within the scope of the invention as defined by the following claims.

The invention claimed is:

1. A braking system for two or three wheel vehicles, the braking system comprising:
a pilot pump provided with a manual actuator, the manual actuator comprising a lever or a pedal, the pilot pump being fluidically connected to a hydraulic actuator device,
wherein said hydraulic actuator device is operatively connected to a braking device associated with a wheel of said vehicle,
wherein the hydraulic actuator device delimits a first and a second actuation chamber separated fluidically from a movable septum along an axial direction,
wherein the first actuation chamber delimits a first volume that contains fluid pressurised by the pilot pump via the manual actuator,
wherein the second actuation chamber delimits a second volume that contains pressurised fluid and is provided with a delivery duct fluidically connected to said braking device,
wherein:
the hydraulic actuator device comprises a by-pass, offset axially with respect to said delivery duct and fluidically connected with the delivery duct,
the movable septum is connected from a side of the second volume to a motor configured to translate axially, independently of a braking action imposed by the pilot pump by the manual actuator,
the system comprising a processing and control unit operatively connected with said motor and programmed so as to pass from a standard operating or deactivation condition of the motor, in which the movable septum connects the first actuation chamber with the by-pass to the second actuation chamber and the delivery duct, to a braking correction condition in which the motor is activated to translate the movable septum so that the first actuation chamber is fluidically separated from the by-pass and the second actuation chamber, and in a manner such that the second actuation chamber is fluidically connected to the delivery duct to control the actuation of the braking device by the pressurised fluid contained in the second actuation chamber,
wherein said movable septum is configured in such a way that the pressure in the first actuation chamber is always greater than, or equal to, the pressure in the second actuation chamber,
wherein said movable septum comprises lip gasket elastically deformable so as to ensure said pressure difference between the first and the second actuation chamber; and
wherein the system comprises at least one vehicle stability sensor, said at least one vehicle stability sensor being operationally connected with the processing and control unit so as to control the actuation of the motor as a function of data received from said at least one vehicle stability sensor.

2. The braking system for vehicles according to claim 1, wherein the lip gasket is shaped so as to have a frustoconical body that tapers moving from a first face facing the first actuation chamber to a second face facing the second actuation chamber.

3. The braking system for vehicles according to claim 2, wherein each of the first and the second face have a circular section configured to correspond in shape with respect to a circular cross-section of each of said first and second actuation chambers.

4. The braking system for vehicles according to claim 2, wherein the frustoconical body comprises an annular seat formed on a side of the first face so as to receive the pressurised fluid from the side of the first actuation chamber and to deform, ensuring sealing against an inner side wall of a volume that delimits the first and the second actuation chamber.

5. The braking system for vehicles according to claim 2, wherein the first face has a first outer diameter substantially equal to an inner diameter of an inner side wall of the volume that delimits the first and the second actuation chamber, and wherein the second face has a second external diameter less than the inner diameter of an inner side wall of the volume that delimits the first and the second actuation chamber, so as to allow a radial crushing of the frustoconical body when the pressure in the second actuation chamber exceeds the pressure in the first actuation chamber.

6. The braking system for vehicles according to claim 1, wherein the hydraulic actuator device is configured in such a way that, in a condition of rest or non-actuation, and in the standard operating condition, the movable septum is positioned between the by-pass and the delivery duct so as to allow the fluid connection between said first and second actuation chamber through the by-pass, the pressures in said first and second actuation chamber being equal to each other and to the pressure in the delivery duct.

7. The braking system for vehicles according to claim 1, wherein the hydraulic actuator device is configured in such a way that, in the braking correction condition, the processing and control unit controls the motor to move the movable septum so as to fluidically separate the first actuation chamber from the by-pass, reducing the first volume of the first actuation chamber and increasing the second volume of the second actuation chamber to decrease the pressure in said second actuation chamber and in said delivery duct.

8. The braking system for vehicles according to claim 1, wherein the hydraulic actuator device is connected to a hydraulic fluid reservoir through a channel arranged on the hydraulic actuator device upstream of the movable septum and the by-pass, so as to allow compensation of wear of the friction material of the braking device by injecting hydraulic fluid into the first actuation chamber.

9. The braking system for vehicles according to claim 1, wherein the motor comprises an electric motor and a related kinematic connection mechanism for translation of the movable septum.

10. The braking system for vehicles according to claim 9, wherein said kinematic connection mechanism is configured to control the movable septum in response to pressure applied to the manual actuator.

11. The braking system for vehicles according to claim 1, further comprising at least one vehicle wheel-lock detection sensor being operationally connected with the processing and control unit so as to control the actuation of the motor as a function of data received from said at least one vehicle wheel-lock sensor.

12. The braking system for vehicles according to claim 1, wherein said braking device comprises a disc, drum or shoe brake.

13. The braking system for vehicles according to claim 1, wherein the pilot pump is a front pilot pump with associated front manual actuator, the front pilot pump being operationally connected to a front hydraulic actuator device; and
the braking system further comprising a rear pilot pump with associated lever or pedal rear manual actuator, the rear pilot pump being operationally connected to a hydraulic actuator device,
wherein each front and rear hydraulic actuator device is operationally connected to a separate front and rear braking device associated, respectively, with a front and rear wheel of said vehicle,
wherein each front and rear hydraulic actuator device is provided with a front motor and a rear motor respectively, and wherein the system is provided with a processing and control unit operationally connected to the front and the rear motor of each front and rear hydraulic actuator device, in order to oversee the functioning of the braking system.

14. A kit for a braking system for a vehicle, the kit comprising:
a pilot pump provided with a manual actuator, the manual actuator comprising a lever or a pedal, the pilot pump being fluidically connected to a hydraulic actuator device,
wherein said hydraulic actuator device is operatively connected to a braking device associated with a wheel of said vehicle,
wherein the hydraulic actuator device delimits a first and a second actuation chamber separated fluidically from a movable septum along an axial direction,
wherein the first actuation chamber delimits a first volume that contains fluid pressurised by the pilot pump via the manual actuator,
wherein the second actuation chamber delimits a second volume that contains pressurised fluid and is provided with a delivery duct fluidically connected to said braking device,
wherein:
the hydraulic actuator device comprises a by-pass, offset axially with respect to said delivery duct and fluidically connected with the delivery duct,
the movable septum is connected from a side of the second volume to a motor configured to translate axially, independently of a braking action imposed by the pilot pump by the manual actuator,
the kit comprising a processing and control unit operatively connected with said motor and programmed so as to pass from a standard operating or deactivation condition of the motor, in which the movable septum connects the first actuation chamber with the by-pass to the second actuation chamber and the delivery duct, to a braking correction condition in which the motor is activated to translate the movable septum so that the first actuation chamber is fluidically separated from the by-pass and the second actuation chamber, and in a manner such that the second actuation chamber is fluidically connected to the delivery duct to control the actuation of the braking device by the pressurised fluid contained in the second actuation chamber, wherein said movable septum is configured in such a way that the pressure in the first actuation chamber is always greater than, or equal to, the pressure in the second actuation chamber,
wherein said movable septum comprises lip gasket elastically deformable so as to ensure said pressure difference between the first and the second actuation chamber; and
wherein the system comprises at least one vehicle stability sensor, said at least one vehicle stability sensor being operationally connected with the processing and control unit so as to control the actuation of the motor as a function of data received from said at least one vehicle stability sensor.

15. The kit according to claim 14, further comprising at least one vehicle wheel-lock detection sensor, the at least one wheel-lock detection stability sensor being operationally connected with the processing and control unit so as to control the actuation of the motor as a function of data received from the at least one vehicle wheel-lock detection sensor.

16. A braking system for a vehicle, the braking system comprising:
a pilot pump provided with a manual actuator, the manual actuator comprising a lever or a pedal, the pilot pump being fluidically connected to a hydraulic actuator device,
wherein said hydraulic actuator device is operatively connected to a braking device associated with a wheel of said vehicle,
wherein the hydraulic actuator device delimits a first and a second actuation chamber separated fluidically from a movable septum along an axial direction,
wherein the first actuation chamber delimits a first volume that contains fluid pressurised by the pilot pump via the manual actuator,
wherein the second actuation chamber delimits a second volume that contains pressurised fluid and is provided with a delivery duct fluidically connected to said braking device,
wherein:
the hydraulic actuator device comprises a by-pass, offset axially with respect to said delivery duct and fluidically connected with the delivery duct,
the movable septum is connected from a side of the second volume to a motor configured to translate axially, independently of a braking action imposed by the pilot pump by the manual actuator,
the system comprising a processing and control unit operatively connected with said motor and programmed so as to pass from a standard operating or deactivation condition of the motor, in which the movable septum connects the first actuation chamber with the by-pass to the second actuation chamber and the delivery duct, to a braking correction condition in which the motor is activated to translate the movable septum so that the first actuation chamber is fluidically separated from the by-pass and the second actuation chamber, and in a manner such that the second actuation chamber is fluidically connected to the delivery duct to control the actuation of the braking device by the pressurised fluid contained in the second actuation chamber;
wherein said movable septum is configured in such a way that the pressure in the first actuation chamber is always greater than, or equal to, the pressure in the second actuation chamber;

wherein said movable septum comprises lip gasket elastically deformable so as to ensure said pressure difference between the first and the second actuation chamber;

wherein the motor comprises an electric motor and a related kinematic connection mechanism for translation of the movable septum; and wherein said kinematic connection mechanism is configured to control the movable septum in response to pressure applied to the manual actuator.

* * * * *